United States Patent [19]
Higuchi et al.

[11] 4,422,722
[45] Dec. 27, 1983

[54] COLOR SEPARATION OPTICAL SYSTEM FOR COLOR TELEVISION CAMERA

[75] Inventors: Takeshi Higuchi; Kazuo Yoshikawa, both of Ohmiya; Hideo Buto, Okegawa, all of Japan

[73] Assignee: Fuji Photo Optical Co., Ltd., Saitama, Japan

[21] Appl. No.: 230,605

[22] Filed: Feb. 2, 1981

[30] Foreign Application Priority Data

Feb. 22, 1980 [JP] Japan .................. 55-21216

[51] Int. Cl.³ .................. G02B 27/10; H04N 9/09
[52] U.S. Cl. .................. 350/173; 350/174; 358/55
[58] Field of Search .................. 350/173, 174, 169, 170, 350/171; 358/55

[56] References Cited

U.S. PATENT DOCUMENTS

| | | | |
|---|---|---|---|
| 3,590,145 | 1/1971 | Schneider et al. | 350/173 |
| 3,824,004 | 7/1974 | Doi et al. | 350/173 |
| 4,085,419 | 4/1978 | Sekiguchi | 358/55 |
| 4,123,777 | 10/1978 | Sekiguchi | 358/55 |
| 4,171,869 | 10/1979 | Higuchi et al. | 350/173 |

FOREIGN PATENT DOCUMENTS

| | | | |
|---|---|---|---|
| 1577746 | 8/1967 | France | 350/173 |
| 54-104729 | 8/1979 | Japan | 358/55 |

Primary Examiner—Jon W. Henry
Attorney, Agent, or Firm—Eyre, Mann, Lucas & Just

[57] ABSTRACT

A color separation optical system consisting of prism blocks is provided with a bias light source and a bias light guide-in device. The bias light guide-in device consists of a plane parallel plate located with an air gap in front of an entrance face of the color separation optical system. The plane parallel plate has light reflecting surfaces to reflect the bias light toward the entrance face. The light reflecting surfaces are provided at the periphery of the plane parallel plate and are desirably made into light diffusing faces.

6 Claims, 6 Drawing Figures

COLOR SEPARATION OPTICAL SYSTEM FOR COLOR TELEVISION CAMERA

BACKGROUND OF THE INVENTION

1. Field of the Invention

This invention relates to a color separation optical system for a color television camera, and more particularly to an improvement of a color separation optical system provided with a bias light device.

2. Description of the Prior Art

Generally, in the color separation optical system for a color television camera, a bias light system should be provided to illuminate the light receiving face of an image pick up element such as an image pick up tube or CCD (charge coupled device) for improving various properties thereof such as rise characteristics and after image characteristics. Since the bias light should normally be provided simultaneously on the light receiving faces of image pick up elements for three primary color channels R.G.B., the bias light is usually guided into a color separation optical system so that the bias light may be provided on the three color channels through the color separation optical system. Such a system is advantageous in that only one light source is needed for the bias light and the structure of the system including the light source is made simple. Japanese Patent Publication Nos. 29888/1975 and 29889/1975 show such examples.

Recently, there has been made a trial to improve the sensitivity of the camera by 18 dB in an electric system in order to obtain color images in comparatively dark scenes. Under such circumstances, the above mentioned bias light system is insufficient because of ununiform distribution of bias light illumination.

DETAILED DESCRIPTION OF THE PRIOR ART

Figure 1:
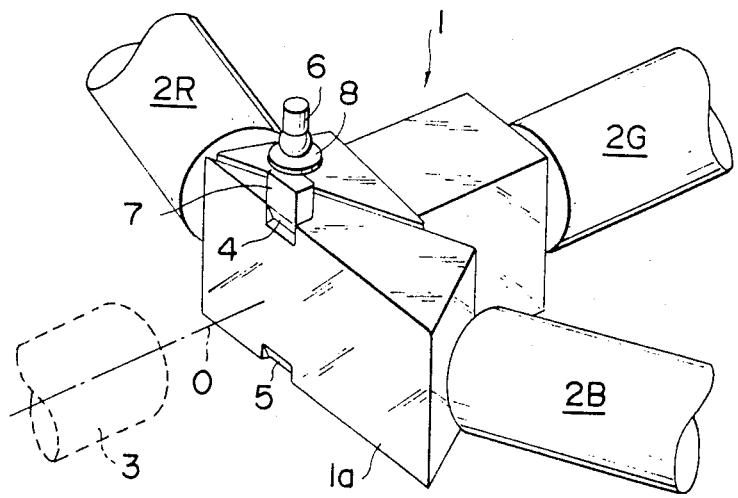
FIG. 1 is a perspective view of an example of a prior art color separation optical system provided with a bias light device for a color television camera.
Figure 2:
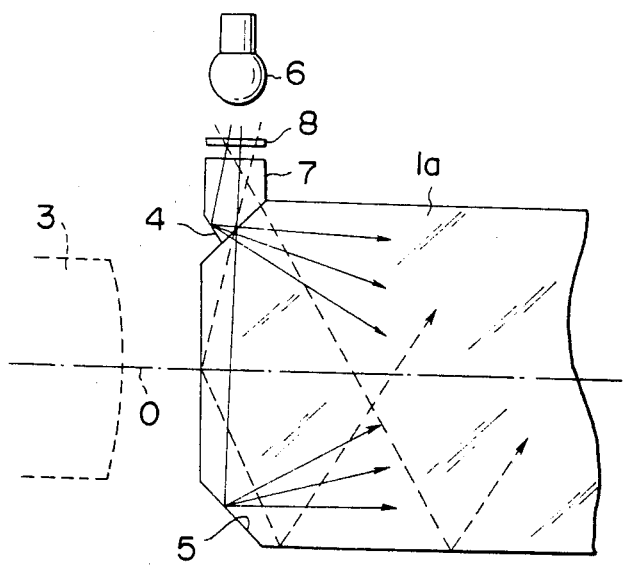
FIG. 2 is a plan view of the example of a prior art as shown in FIG. 1.

The above mentioned prior art will hereinbelow be described in more detail with reference to FIGS. 1 and 2. A prism type color separation optical system 1 consisting of three prism blocks is located between a taking lens 3 of the television camera having an optical axis O and image pick up elements 2R, 2G, 2B like image pick up tubes and separates an image from the taking lens 3 into three color components or R (red), G(green) and B(blue). The prism type color separation optical system 1 has reflecting surfaces 4 and 5 in a part of the first prism 1a having an entrance face serving as an entrance face of the whole optical system 1. The reflecting surfaces 4 and 5 are formed at the upper and lower corners of the front entrance face of the first prism block 1a. A bias light source 6 is located outside the optical system 1 beside the front face of the first prism block 1a as shown in FIGS. 1 and 2. A small prism block 7 is attached to one corner of the first prism block 1a to guide in the bias light from the light source 6 into the first prism block 1a. The bias light from the bias light source 6 is, as shown in FIG. 2, reflected by the reflecting surfaces 4 and 5 after passing through the small prism block 7, and then separated into three color components by the color separation optical system 1 and received by the image pick up elements 2R, 2G, 2B. In front of the small prism block 7 is located a color balancing control filter to control the amount of the bias light. The reflecting surfaces 4 and 5 are made into light diffusing faces or toric faces in order to uniformly illuminating the light receiving faces of the image pick up elements.

In the above mentioned prior art, there is a problem as follows. As shown in FIG. 2, the desirable bias light reflected by the reflecting surfaces 4 and 5 advances as shown by arrowed solid lines. At the same time, however, there are some light paths in which the bias light advances without being reflected by the reflecting surfaces 4 and 5 as shown by arrowed broken lines. The bias light not reflected by the reflecting surfaces 4 and 5 does not advance in paths symmetric with respect to the optical axis O and accordingly does not illuminate the image pick up elements uniformly. However, the amount of the bias light not reflected by the reflecting surfaces 4 and 5 is so small that there is no significant problem for the uniformity of bias light illumination. In the aforementioned recently developed high sensitive camera having enhanced sensitivity of 18 dB, however, the not-reflected bias light affects the uniformity of the bias light illumination.

SUMMARY OF THE INVENTION

In light of the above-mentioned drawbacks inherent in the conventional color separation optical system for a color television camera, the primary object of the present invention is to provide a color separation optical system for a color television camera having a function to uniformly illuminate the light receiving faces of the image pick up elements with bias light.

The color separation optical system in accordance with the present invention is characterized in that a plane parallel plate is located with an air gap in front of the entrance face of the optical system and the plane parallel plate is provided on the periphery thereof with a number of light reflecting faces so as to reflect the bias light toward the entrance face of the optical system via the air gap.

DESCRIPTION OF PREFERRED EMBODIMENTS

Now the present invention will be described in detail with reference to the accompanying drawings particularly referring to FIGS. 3 to 6. A first embodiment of the present invention will be described referring to FIGS. 3 and 4, and second and third embodiments will be described referring to FIGS. 5 and 6, respectively.

Figure 3:
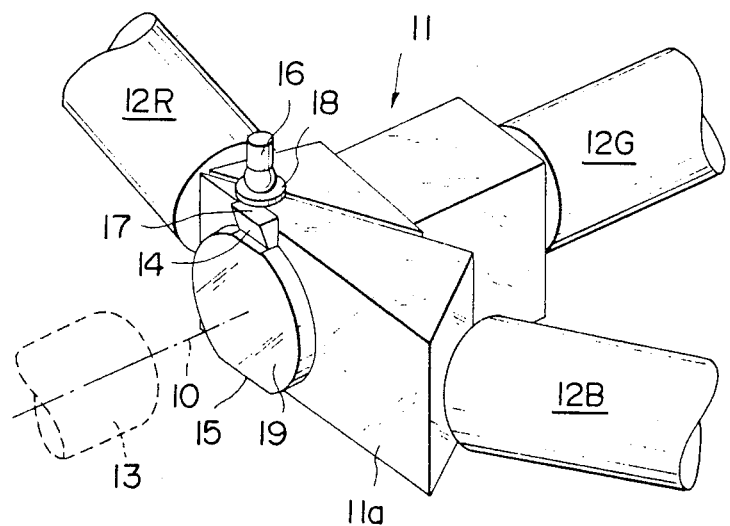
FIG. 3 is a perspective view of an embodiment of a color separation optical system in accordance with the present invention.
Figure 4:
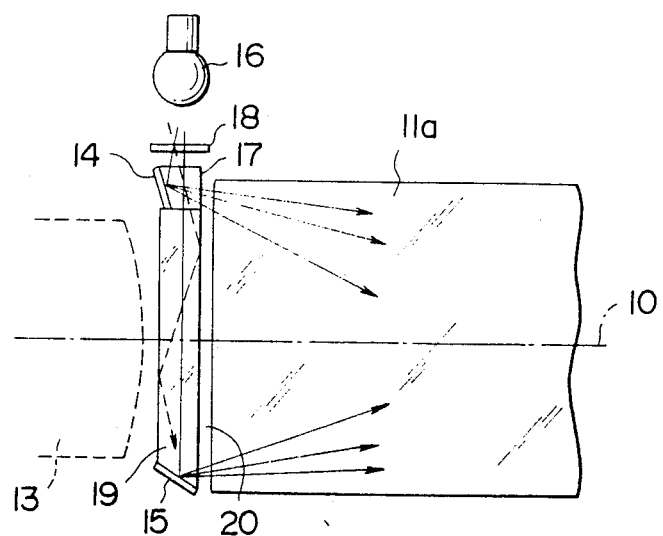
FIG. 4 is a plan view of the embodiment as shown in FIG. 3.

Referring to FIGS. 3 and 4, a plane parallel plate 19 is located with an air gap 20 in front of the first prism block 11a of a color separation optical system 11 consisting of three prism blocks for three color components provided with image pick up elements 12R, 12G, 12B like image pick up tubes. The color separation optical system 11 is provided between a taking lens 13 and the image pick up elements similarly to the foregoing prior art. The plane parallel plate 19 has a size large enough to cover the whole light flux coming from the taking lens 13. The opposite faces of the plane parallel plate 13 are parallel to the entrance face of the first prism block 11a. The plane parallel plate 19 has at its upper and lower ends light reflecting faces 14 and 15 to reflect bias light coming from a bias light source 16 located beside the plane parallel plate 19 toward the entrance face of the first prism block 11a.

In more detail, the plane parallel plate 19 is provided with at its lower end a reflecting surface 15 formed as a facet of the plane parallel plate 19 and at its upper end another small prism block 17 attached thereto. The small prism block 17 has a reflecting surface 14 to reflect the bias light toward the entrance face of the first prism block 11a. The reflecting surfaces 14 and 15 are made into light diffusing faces or toric faces to enhance the uniformity of bias light illumination. However, it should be noted that this is not always necessary in this invention, since the essential gist of invention lies in the provision of the plane parallel plate 19 located with an air gap in front of the entrance face of the color separation optical system 11.

As shown in FIG. 4, the bias light reflected by the reflecting surfaces 14 and 15 is reflected toward the entrance face of the first prism block 11a and caused to advance in desirable paths symmetric with respect to the optical axis O of the optical system 11. Further, the light coming from the bias light source 16 and not being reflected by the reflecting surface 14 or 15 advances within the plane parallel plate 19 totally reflected by the opposite surfaces of the plate 19 and does not advance toward the entrance face of the prism block 11a. The bias light not reflected by the reflecting surfaces 14 and 15 is indicated by broken lines with an arrow in FIG. 4. Therefore, the bias light not reflected by the reflecting surface 14 or 15 is not received by the image pick up elements 12R, 12G, 12B. There is, therefore, no fear of ununiform illumination of the bias light upon the image pick up elements. In FIGS. 3 and 4, the reference numeral 18 designates a color balancing control filter as is used in the conventional color separation optical system.

It should be understood that the bias light reflecting surfaces 14 and 15 may not always be located at symmetric positions but may be divided into a larger number of reflecting surfaces positioned around the plane parallel plate at its periphery. Further, it should be noted that the small prism 17 may not be provided and the upper reflecting surfaces 14 may be formed at a part of the plane parallel plate itself or may be replaced by a different reflecting means provided on the periphery of the plane parallel plate 19.

Further, it should be noted that the color separation optical system may not be of the type as shown in FIGS. 1 to 6, i.e. Phyllips type, but may be of a different type using prisms.

Figure 5:
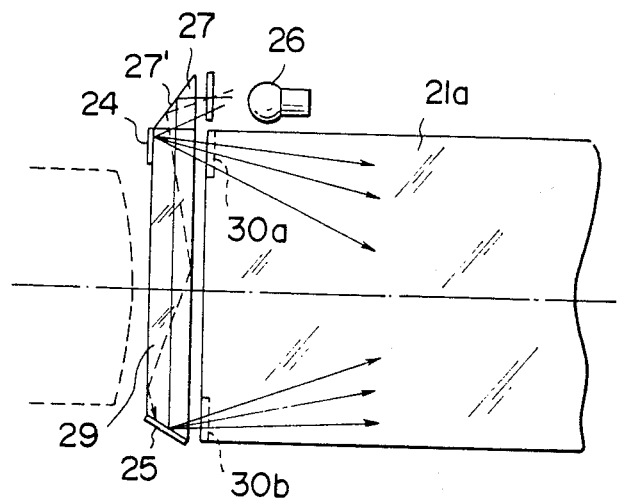
FIG. 5 is a plan view of another embodiment of the present invention.

Now referring to FIG. 5, a second embodiment of the present invention will be described in detail. This embodiment aims to make the size of the color separation optical system small by changing the position of the bias light source as shown at 26. Similarly to the first embodiment, a plane parallel plate 29 is provided with an air gap in front of the entrance face of the first prism block 21a of a color separation optical system. The plane parallel plate 29 has at its upper and lower ends bias light reflecting surfaces 24 and 25 to reflect the bias light toward the entrance face of the prism block 21a. A small prism 27 is located at the upper end of the plane parallel plate 29 to reflect the bias light from the light source 26 toward the lower reflecting surface 25 via its reflecting surface 27'. The reflecting surface 27' of the small prism block 27 may be a normal mirror reflecting surface, but the reflecting surfaces 24 and 25 of the plane parallel plate 29 are desired to be light diffusing faces or toric faces.

Further, in the second embodiment, it is desirable to make parts 30a and 30b of the entrance face of the first prism block 21a just in front of the reflecting surfaces 24 and 25 into light diffusing surfaces. In this case, the reflecting surfaces 24 and 25 may not be light diffusing faces.

Figure 6:
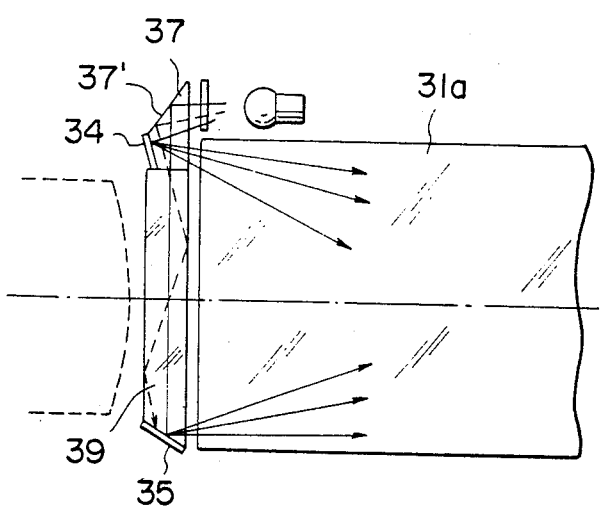
FIG. 6 is a plan view of still another embodiment of the present invention.

Another embodiment will be described referring to FIG. 6. This embodiment is characterized in the small prism block 37 attached to the upper end of the plane parallel plate 39 located with an air gap in front of the first prism block 31a. The plane parallel plate 39 has reflecting surfaces 34 and 35 at its upper and lower ends. The upper reflecting surface 34 is formed at a part of a small prism block 37 to reflect the bias light toward the entrance face of the first prism block 31a in a similar manner as in the first embodiment. The small prism block 37 has a reflecting surface 37' to reflect the bias light from the light source toward the lower reflecting surface 35 and also to have the reflecting surface 34 to reflect the bias light toward the first prism block 31a.

In both the second and third embodiments, the bias light not reflected by the reflecting surfaces 24,25,34,35 is totally reflected by the opposite faces of the plane parallel plate 29,39 and is not received by the image pick up elements.

Although some part of the bias light not reflected by the reflecting surfaces 24,25,34,35 is reflected by the lower reflecting surface 25,35, the light reflected thereby does not affect the ununiformity of the bias light since it is not direct illumination from the reflecting surface 37' of the small prism block 37 advancing in a wrong direction through the optical system.

We claim:

1. A color separation optical system for a color television camera disposed between a taking lens of a television camera and a plurality of image pick up elements for color components consisting of a number of prism blocks wherein the improvement comprises a plane parallel plate located with an air gap in front of an entrance face of a prism block of the color separation system, and bias light reflecting surfaces provided at a periphery of said plane parallel plate for reflecting bias light toward said entrance face of the prism block, said bias light reflecting surfaces being toric surfaces.

2. A color separation optical system as defined in claim 1 wherein said plane parallel plate is provided at its periphery with a small prism block for reflecting the bias light toward said reflecting surfaces.

3. A color separation optical system as defined in claim 2 wherein said small prism block is provided with a light reflecting surface for reflecting the bias light toward into said prism block of the color separation optical system.

4. A color separation optical system as defined in claim 1, 2 or 3 wherein said entrance face is provided with light diffusing parts at the portions where the bias light reflected by said reflecting surfaces passes.

5. A color separation optical system as defined in claim 1 or 2 wherein said reflecting surfaces are light diffusing faces.

6. A color separation optical system for a television camera used together with a bias light source for providing bias illumination to an image pick-up device comprising:
- a color separation prism consisting of a plurality of prism blocks having entrance faces to receive illumination light from said bias light source and the light from a taking lens, said prism blocks color-separating the light incident through said entrance faces into a plurality of color light components, and having the color-separated light components outputed toward said image pick-up devices, and
- a plane parallel plate disposed between said color separation prism and said taking lens and in front of said entrance face of the color separation prism with an air gap provided between said entrance face and the same, the plane parallel plate being provided with a central region formed with transparent parallel surfaces for having the light from the taking lens transmit therethrough toward said entrance face and at least two reflecting surfaces provided outside said central region, said reflecting surfaces being disposed outside the said central region and opposite to each other and reflecting the light from said bias light source toward said entrance face of the color separation prism, the internal faces of said parallel surfaces of said central region totally reflecting the light from said bias light source toward one of said reflecting surfaces.

* * * * *